United States Patent

Kolesar

[11] 3,983,655
[45] Oct. 5, 1976

[54] FISHING LURE
[75] Inventor: Joseph J. Kolesar, Yonkers, N.Y.
[73] Assignee: The Raymond Lee Organization, Inc., New York, N.Y.; a part interest
[22] Filed: Sept. 29, 1975
[21] Appl. No.: 617,599

Related U.S. Application Data
[63] Continuation-in-part of Ser. No. 496,368, Aug. 12, 1974, abandoned.

[52] U.S. Cl. .............................. 43/42.1; 43/42.16; 43/42.19
[51] Int. Cl.[2] ........................................ A01K 85/00
[58] Field of Search ............. 43/42.1, 42.16, 42.19, 43/42.41

[56] References Cited
UNITED STATES PATENTS
664,476    12/1900    Hall ................................. 43/42.45
2,494,407  1/1950     Rhodes ......................... 43/42.16 X
2,572,721  10/1951    Hatt ................................. 43/42.19
2,589,435  3/1952     Roeben ........................... 43/42.1 X Primary Examiner—Hugh R. Chamblee
Assistant Examiner—Daniel J. Leach
Attorney, Agent, or Firm—Daniel Jay Tick

[57] ABSTRACT

A weed-resisting fishing lure comprises a shaft removably affixed to a fishing line. A fish hook has a shank and a hook having a tip and is disposed on the shaft with its shank parallel to said shaft. A helical spring is coaxially mounted around the shaft and the shank of the fish hook for spinningly mounting the fish hook on the shaft. A rubber body for resisting weeds has a sleeve part extending over part of the shaft, the shank of the fish hook and the spring and a flap part extending from the sleeve part to the tip of the hook. The lure spins when retrieved and appears to be a minnow and thereby attracts fish when spinning.

5 Claims, 3 Drawing Figures

FISHING LURE

BAKCGROUND OF THE INVENTION

The present application is a continuation-in-part of application Ser. No. 496,368, filed Aug. 12, 1974 for Fishing Lure, now abandoned.

The present invention relates to a fishing lure. More particularly, the invention relates to a weedless spinner hook.

Objects of the invention are to provide a fishing lure or weedless spinner hook of simple structure, which is inexpensive in manufacture, assembled and disassembled with convenience and facility, easy, convenient and simple to use, resists weeds while retaining hooking ability, appeals to most fresh and salt water game fish, permits fishing for a wide variety of fish and fish of different sizes on one lure, provides more positive hooking than known lures, slides past and through snags and weeds, rolls in motion yet bares its hooks instantly, light in weight, presents the effect of a crippled minnow in top water, may be used to fish at any desired depth by adding weight thereto, and is efficient, effective and reliable in operation.

Applicant's fishing lure is a "weedless" lure and has the advantages of attraction and hooking. The hook is used as the attraction component, or the attraction component of a lure. Prior to applicant's invention, there would be no reason to spin a hook. A bare hook has no attraction and a bare spinning hook may cause missed strikes and may pick up more weeds, and adds nothing to attraction. No weed guard, prior to applicant's invention has been designed to impart spinning to the hook with a shape providing the proven attraction of spinning. Due to the "life" inherent in the spinning, even a single unit may be used as a lure and is naturally most effective for weedless use. Although the 180° hook arrangement of applicant spins faster and easier than the 120° hook arrangement, the 120° hood arrangement incurs less bottom snags, uses available hooks, has a unique motion and a slower spin for added protection from weeds.

BRIEF DESCRIPTION OF THE DRAWINGS

In order that the invention may be readily carried into effect, it will now be described with reference to the accompanying drawing, wherein.

In the FIGS., the same components are identified by the same reference numrals.

DETAILED DESCRIPTION OF THE INVENTION

Figure 1:
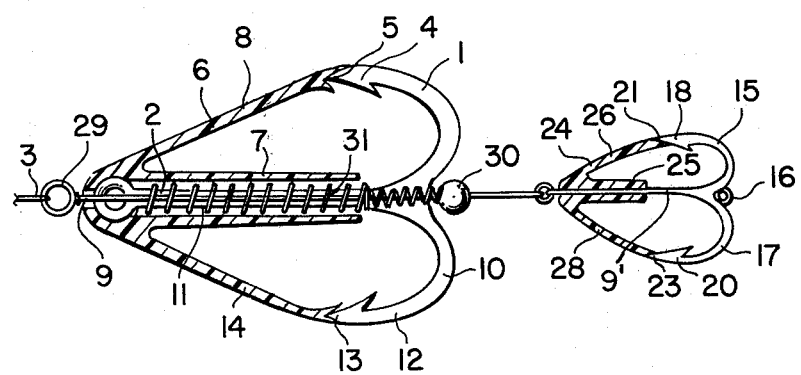
FIG. 1 is a view, partly in section, of an embodiment of the fishing lure of the invention.

The fishing lure of the invention comprises a fish hook 1 having a shank 2 and a hook 4 having a tip 5, as shown in FIG. 1.

In accordance with the invention, a rubber body 6 has a sleeve part 7 extending over the shank 2 of the fish hook and a flap part 8 extending from the sleeve part to the tip 5 of the hook 1, as shown in FIG. 1. The rubber body 6 spins when retrieved and is of general minnow shape when spinning. The rubber body is a special shape which conforms to the hook contour, protects hook points, causes spinning by water pressure against opposing surfaces, allows hooking, is streamlined for minnow shape when spinning and weed resistance. The rubber body is replaceable without the need for any disassembly by having its sleeve part 7 selectively slipped off and over the hereinafter described shanks 2 and 11 of the fish hooks 1 and 10 and the spring 31.

Figure 3:
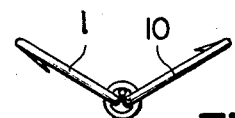
FIG. 3 is an end view of an embodiment of the fishing lure of the invention.

A shaft 9 is removably affixed to a fishing line 3. The fish hook 1 is rotatably mounted on the shaft 9. That is, the shaft and hook are mounted in a freely rotatable manner relative to each other. An additional fish hook 10 has a shank 11 in parallel relation with the shaft 9 and a hook 12 having a tip 13, as shown in FIG. 1. The shank 2 of the fish hook 1 is in parallel relation with the shaft 9 with the hook 4 thereof in angularly spaced relation with the hook 12 of the additional fish hook 10. The hooks 4 and 12 are preferably spaced approximately 120° from each other, as indicated in FIG. 3. The shaft 9 provides a twist free connection for the fishing line 3 while it provides the axis for the free spinning body of the lure. The hook shanks 2 and 11 constitute a single shank.

In accordance with the invention, the sleeve part 7 of the rubber body 6 extends over the shaft 9 and the shanks 2 and 11 of the fish hooks 1 and 10. The rubber body 6 has an additional flap part 14 (FIGS. 1 and 2) extending from the sleeve part 7 to the tip 13 of the hook 12 of the additional fish hook 10.

The aforedescribed fishing lure constitutes one embodiment of the fishing lure of the invention. In another embodiment of the invention, as illustrated in FIG. 1, the fishing lure comprises a plurality of additional fish hooks such as, for example, three additional fish hooks 15, 16 and 17, having shanks in parallel relation with another shaft 9'. The additional fish hooks 15, 16 and 17 are spaced from, and extend behind, the hooks 1 and 10. The additional fish hooks 15, 16 and 17 have hooks 18, 19 (not shown in the FIGS.) and 20, respectively, in angularly spaced relation with each other and having tips 21, 22 (not shown in the FIGS.) and 23, respectively. The hooks 18, 19 and 20 are preferably spaced 120° from each other.

In accordance with the invention, an additional rubber body 24, shaped similarly to the rubber body 6, has a sleeve 25 extending over the shaft 9' and the shanks of the additional fish hooks 15, 16 and 17. Each of a plurality of flaps 26, 27 (not shown in the FIGS.) and 28 extends from the sleeve part 25 to the tip 21, 22 amd 23 of a corresponding one of the plurality of fish hooks 15, 16 and 17.

The shaft 9 has an eye or loop 29 at one end thereof for fastening the fishing line 3 thereto. A universal joint, swivel or bead 30 is mounted on the shaft 9 between the fish hooks 1 and 10 and the additional fish hooks 15, 16 and 17. A substantially helical spring 31 is mounted on the shanks 2 and 11 of the fish hooks 1 and 10 between the loop 29 and the swivel 30. The spring 31 may comprise a single unit, but is preferably two units. The front part of the spring 31 is mounted on the shank 2 of the fish hook 1 and on the shank 11 of the fish hook 10.

The swivel 30 preferably comprises a substantially universal joint joining the fish hooks 1 and 10 to the additional fish hooks 15, 16 and 17 in a manner whereby the plurality of additional fish hooks 15, 16 and 17 are freely movable relative to the fish hooks 1 and 10. The spring and shaft are unnecessary on the swivel type lure so that the shaft 9' of the rear assembly is really a hook shank. Tandem gangs of spinners are popular with fishermen as trolling rigs.

The hook or hooks are rotatably or spinningly mounted on the shaft via either the swivel 30 or the spring 31. The spring 31 functions as a retainer and is coaxially positioned over the shanks of the hooks. The spring 31 may be replaced by a brazed tube, if desired.

The sleeve of the rubber body fits snugly over the spring or tube 31, so that it remains aligned with the tips of the hooks to prevent them from snagging. The rubber sleeve does not contact the shaft.

The swivel 30 may be only a bead.

The fishing lure of the invention may be used in three basic ways. As a shaft type, the line is affixed to the loop or eye of the shaft. The hook, rubber body and spring spin as a unit around the free shaft. This type spins best and provides the most universal use. As a swivel type, the fishing line is affixed to one eye of the swivel and the loop or eye of the fish hook is affixed to the other eye of the swivel. The spring and shaft are unnecessary. The lure should be weighted internally to spin well and the hook is flattened to 180° with the corresponding body shape. As a clevis type, the line is affixed to the loop or eye of the shaft. The hook swings in a wide arc around the shaft. The body is spoon shaped.

The rubber body merely slips on or off, whether the shaft is open eyed or closed eyed. The spring 31 threads on over a leg of the hook with facility. If a brazed tube is used, the shaft is open eyed. The parts are slid onto the shaft and the shaft is then either wound closed or closed with an open eye type spring.

Figure 2:
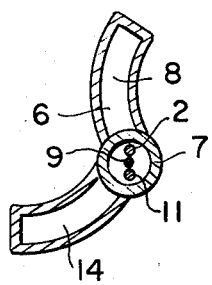
FIG. 2 is a cross-sectional view of another embodiment of the rubber body of the fishing lure of the invention.

The rubber body 6 may be solid, as shown in FIG. 1, or hollow, as shown in FIG. 2.

While the invention has been described by means of specific examples and in specific embodiments, I do not wish to be limited thereto, for obvious modifications will occur to those skilled in the art without departing from the spirit and scope of invention.

I claim:
1. A weed-resisting fishing lure, comprising
a shaft removably affixed to a fishing line;
a first fish hook having a shank and a hook having a tip, said first fish hook being disposed on the shaft with its shank parallel to said shaft;
a substantially helical spring coaxially mounted around the shaft and the shank of the first fish hook for spinningly mounting said first fish hook on said shaft; and
a rubber body for resisting weeds having a sleeve part extending over part of the shaft, the shank of the first fish hook and the spring and a flap part extending from the sleeve part to the tip of the hook, the lure spinning when retrieved and appearing to be a minnow and thereby attracting fish when spinning.

2. A fishing lure as claimed in claim 1, further comprising an additional fish hook having a shank disposed in parallel relation with the shaft and interposed between said shaft and the spring and a hook having a tip, and wherein the hook of the first fish hook is in angularly spaced relation with the hook of the additional fish hook and the rubber body has an additional flap part extending from the sleeve part to the tip of the hook of the additional fish hook.

3. A fishing lure as claimed in claim 2, further comprising an additional shaft swivelly affixed to the first-mentioned shaft and extending behind the hooks of the first fish hook and the additional fish hook, a plurality of additional fish hooks having shanks disposed in parallel relation with the additional shaft and hooks in angularly spaced relation with each other and having tips, and an additional rubber body having a sleeve extending over the additional shaft and the shanks of the plurality of additional fish hooks, said additional rubber body having a plurality of flaps each extending from the sleeve part thereof to the tip of a corresponding one of the plurality of additional fish hooks.

4. A fishing lure as claimed in claim 3, further comprising a loop in the first-mentioned shaft at one end thereof for fastening a fishing line thereto, and a swivel on said first-mentioned shaft at the opposite end thereof for joining the additional shaft to said first-mentioned shaft.

5. A fishing lure as claimed in claim 4, wherein the swivel comprises a substantially universal joint joining the additional shaft to the first-mentioned shaft in tandem in a manner whereby the plurality of additional fish hooks are freely movable relative to the first-mentioned shaft.

* * * * *